Aug. 25, 1931.　　　　J. COLLINS　　　　1,820,120
TIRE GAUGE VALVE
Filed March 11, 1930
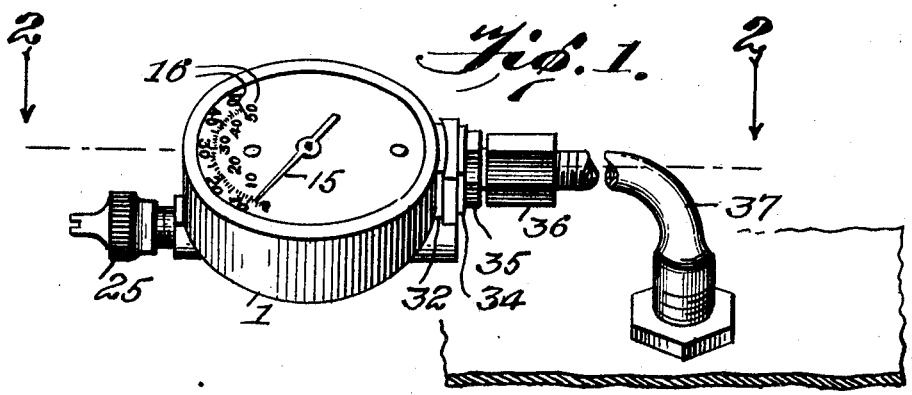
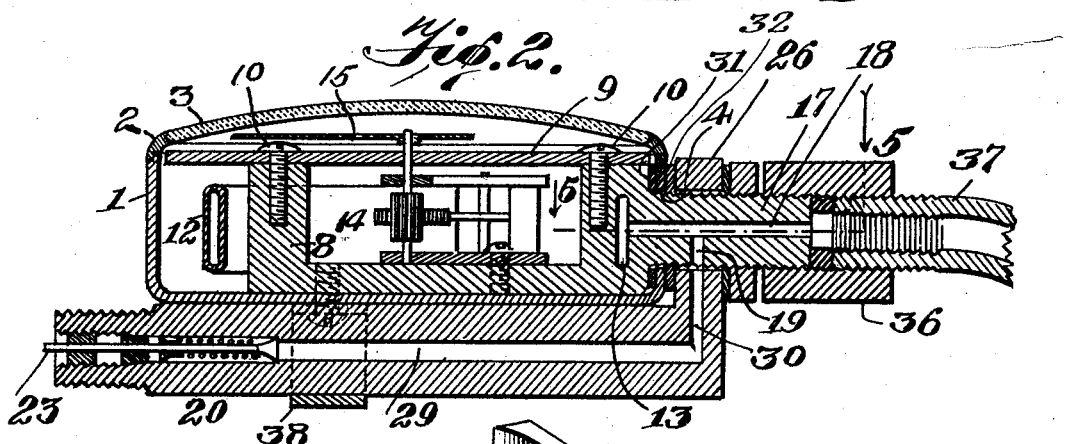
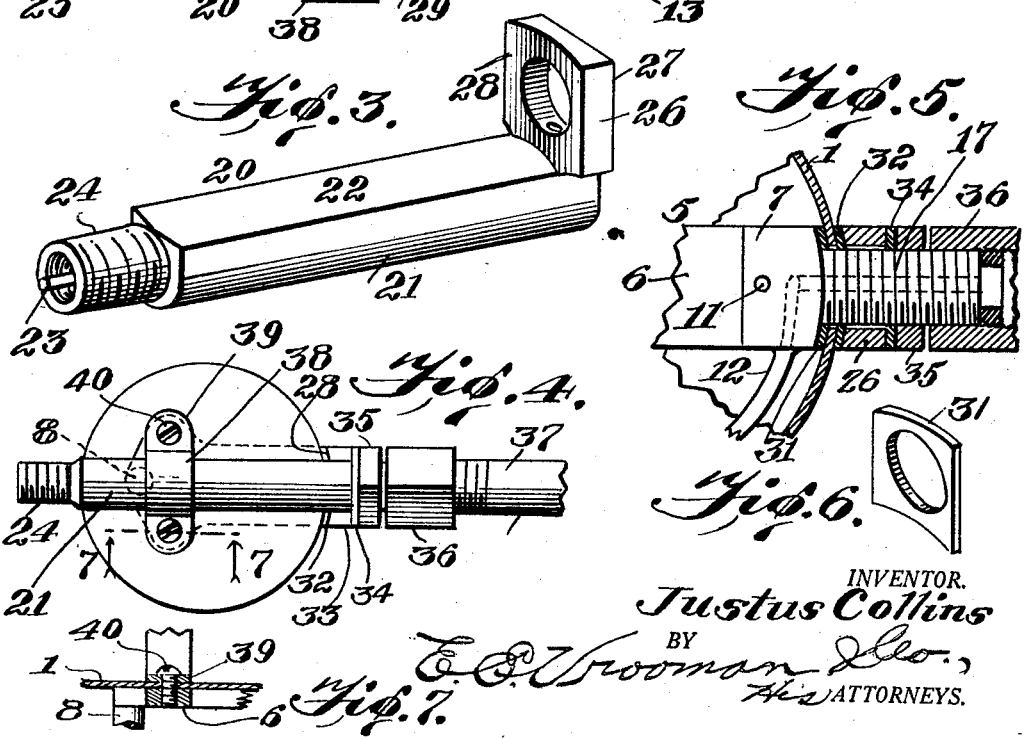
INVENTOR.
Justus Collins
BY
ATTORNEYS.

Patented Aug. 25, 1931

1,820,120

UNITED STATES PATENT OFFICE

JUSTUS COLLINS, OF CHARLESTON, WEST VIRGINIA

TIRE GAUGE VALVE

Application filed March 11, 1930. Serial No. 434,865.

This invention relates to tire gauge valves.

The object of my invention is the construction of a simple and efficient tire gauge valve that will absolutely measure accurately the air pressure in an inner tube of a motor vehicle tire.

Another object of my invention is the construction of a tire gauge valve, which is composed of two essential and indispensable units, to wit: an air gauge and an air-tube device, both of an improved structure, producing a novel and highly useful unitary device.

A still further object of my invention is the provision of novel and efficient means in an air gauge casing for supporting the gear mechanism, and also a novel structure for securing the air-tube device to the casing.

With the foregoing and other objects in view, my invention comprises certain novel constructions, combinations and arrangements of parts as will be hereinafter fully described, illustrated in the accompanying drawings and more particularly pointed out in the appended claims.

In the drawings:

Figure 1 is a perspective view of a tire gauge valve constructed in accordance with this invention.

Figure 2 is an enlarged longitudinal sectional view, taken on line 2—2, Figure 1, and looking in the direction of the arrows.

Figure 3 is an enlarged perspective view of the air-tube device.

Figure 4 is a rear view, in elevation, of my tire gauge valve.

Figure 5 is an enlarged sectional view taken on line 5—5, Figure 2, and looking in the direction of the arrows.

Figure 6 is a perspective view of one of the soft or pliable washers.

Figure 7 is a sectional view taken on line 7—7, Figure 4.

In the drawings, I have shown the preferred embodiment of my device, and will specifically describe the essential parts or units that are absolutely necessary to complete the combination. Each and every one of the following described parts are co-dependent and I produce a very efficient and practical device by the specific character of the co-related elements combined in the present embodiment. Therefore, referring to the drawings by reference numerals, 1 designates a casing of a cylindrical type, which is provided with a removable cover 2; this cover 2 includes a concavo-convexed glass 3, Fig. 2. The casing 1 is provided with an aperture 4 for the purpose hereinafter described.

Within the casing, I place a bracket device 5, which comprises a plate-like body 6 that has a right angled extended base 7 and an integral outwardly extending boss 8; the base 7 and boss 8 are of the same length because the dial 9 is placed against their outer ends or faces. The dial 9 is secured upon the base and boss by means of screws 10. One of the screws enter the screw-threaded socket 11 in base 7. The other screw is threaded in a similar socket formed in the boss 8, Fig. 2. An expansible tube 12 is fastened at one end to base 7 in communication with the passage 13; the other end of tube 12 is suitably connected to gearing means 14 that is behind the dial 9 and which actuates the hand 15. On the dial 9 are two rows of indicating numerals 16, arranged in opposite position, so that the pressure in the inner tube can be read easily by the observer.

Extending outwardly from the base 7, and through aperture 4, is an externally threaded sleeve 17. This sleeve 17 is provided with a central air passage 18 which communicates at its inner end with passage 13. It is also provided with a passage 19 for the purpose hereinafter described.

The air-tube device 20 forms a very essential part of the combination and my tire gauge valve would not be complete and would not work without this device, nor could this device perform a useful function without the casing 1 and the co-ordinate parts therein. This air-tube device 20 comprises a body 21, which is provided with a flat inner face 22, that rests snugly against the back of casing 1. In the outer end of body 21, an ordinary valve device 23 is placed. The outer end of body 22, at 24, is externally threaded for receiving the usual cap 25. Integral with the inner end of body 22 and extending at right angles therefrom is the collar 26. This collar 26 is flat on its outer face 27, but is concaved on its inner face 28, for the purpose hereinafter described. The body 21 is provided with a longitudinally extending passage 29, and with a right angularly extending passage 30; this passage 30 communicates at its outer end with passage 19 in sleeve 17. A soft washer 31 is placed on sleeve 17 between the base 7 and casing 1. A second soft washer 32 is placed on sleeve 17 between the casing 1 and collar 26. A third soft or pliable washer 34 is placed on sleeve 17 between collar 26 and nut 35. Therefore, it will be seen that when the nut 35 is tightly screwed into place, the soft washers will snugly fit their contacting parts, conforming to the contour thereof and tightly sealing the joints or connections against air leakage, as well as preventing any water or foreign substances entering the casing 1 or the air-tube device 20 from the outside. All of these soft washers may be formed from such material as lead and will have a tendency to be mashed or crowded into the smallest crevice to seal efficiently the entire device. Further, the washers 31 and 32 will conform to the curved surfaces of the contacting elements. The washer 32 is seated in the inner concaved face 28 of collar 26, resting tightly against the curved outer face of the casing 1.

On the outer end of threaded sleeve 17 is a suitable coupling 36; this coupling is provided with a right and left internal thread, so that the coupling can be readily screwed upon sleeve 17 and also upon the valve tube 37 of the inner tube of a tire.

A clamping band 38 is placed over the body 21 and its two ears 39 are held tightly against the back of the casing by screws 40. These screws 40 extend through the casing 1 and into the plate-like body 6 at opposite sides of the boss 8, whereby the bracket device 5 is held against the inner face of the casing 1 and the air-tube device is held snugly against the outer face of casing 1. Therefore it will be seen that screws 40 (Figs. 4 and 7) perform two useful functions, to wit: they hold band 38 in place, clamping the air-tube device to the casing and they also hold the bracket device in place within the casing.

In operation, air is forced into passage 29, thence into passages 30, 19 and 18. Air enters the inner tube and at the same time expansible tube 12, so that the pound pressure in the inner tube is at once indicated on the dial by hand 15. Also while no air is being forced into passage 29 and thence into the inner tube, the hand 15 will stand in position, indicating the actual pressure of the air in the inner tube. It is to be noted that all of these described parts are absolutely co-dependent, as the air-tube device 20 would not perform a useful function without the parts supported upon the casing, nor would the parts supported upon the casing perform a useful function, as without the air-tube device, all the air would leak out of passage 19 and there would be no way of recharging or inflating the inner tube.

My simple device involves a construction whereby it is watertight at its joints and its indicating dial is readable in any position; it is easily connected to any automobile valve tube by having a right and left threaded union; if my device should become inoperative for any reason, it can be instantly detached, and the inside checkvalve 23 taken from it and placed in the valve in the tire, to which it was attached and thus the old valve could be used as is now done until my valve could be repaired or a new one secured.

I have found from actual experience with a working model of my device that it is very compact and efficient. It is also an established fact that the improvements disclosed in the drawings, described in this specification and more specifically pointed out in the claims are each and all co-dependent and co-operative in producing my new and novel tire gauge valve.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. An attachment for a tire gauge, comprising a body, and said body provided at one end with a sleeve-engaging outwardly-extending collar and in its other end with valve means, 2. An attachment for a tire gauge, comprising an elongated body, said body provided on its inner end with a sleeve-surrounding collar extending at right angles to said body, and said body provided on its outer end with threads and with valve means therein.

3. An attachment for a tire gauge, comprising an elongated body having a flat casing-engaging inner face, said body provided on its inner end with an integral sleeve-surrounding collar, said collar extending at right angles to said body, said collar being concaved on its inner face, said body and collar provided with a common passage therethrough, and said body provided in its outer end with valve means, substantially as shown and described.

In testimony whereof I hereunto affix my signature.

JUSTUS COLLINS.